(12) United States Patent
Abdelmalek et al.

(10) Patent No.: US 12,556,482 B2
(45) Date of Patent: Feb. 17, 2026

(54) USER PLANE CONGESTION CONTROL SERVICE

(71) Applicant: Verizon Patent and Licensing Inc., Basking Ridge, NJ (US)

(72) Inventors: Yousef Abdelmalek, New Providence, NJ (US); Jerry Steben, Fort Worth, TX (US); Violeta Cakulev, Millburn, NJ (US); Parry Cornell Booker, Sunnyvale, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 650 days.

(21) Appl. No.: 17/725,670

(22) Filed: Apr. 21, 2022

(65) Prior Publication Data

US 2023/0344774 A1    Oct. 26, 2023

(51) Int. Cl.
*H04L 47/24* (2022.01)
*H04L 47/11* (2022.01)

(52) U.S. Cl.
CPC .............. *H04L 47/24* (2013.01); *H04L 47/11* (2013.01)

(58) Field of Classification Search
CPC ................................ H04L 47/24; H04L 47/11
See application file for complete search history.

(56) References Cited

U.S. PATENT DOCUMENTS

| | | | | |
|---|---|---|---|---|
| 2001/0033581 | A1* | 10/2001 | Kawarai | H04L 47/20 370/468 |
| 2006/0218302 | A1* | 9/2006 | Chia | H04L 47/2425 370/230.1 |
| 2007/0124306 | A1* | 5/2007 | Nelson | H03M 7/3088 |
| 2011/0182176 | A1* | 7/2011 | Kenesi | H04L 47/11 370/230 |
| 2012/0281530 | A1* | 11/2012 | Sambhwani | H04W 74/006 370/230 |
| 2013/0051228 | A1* | 2/2013 | Kim | H04W 4/70 370/230 |
| 2013/0083806 | A1* | 4/2013 | Suarez Fuentes | H04L 67/306 370/465 |
| 2016/0192239 | A1* | 6/2016 | Salvador | H04W 28/0268 370/331 |
| 2016/0295543 | A1* | 10/2016 | Adams | H04W 8/183 |
| 2016/0337239 | A1* | 11/2016 | Nasielski | H04L 47/11 |
| 2016/0359750 | A1* | 12/2016 | Miklós | H04L 5/006 |
| 2017/0118672 | A1* | 4/2017 | Zhang | H04W 28/0284 |
| 2020/0068430 | A1* | 2/2020 | Chan | H04W 28/0284 |
| 2020/0146054 | A1* | 5/2020 | Jeon | H04W 74/006 |
| 2020/0252837 | A1* | 8/2020 | Kim | H04M 15/8044 |
| 2020/0389835 | A1* | 12/2020 | Talebi Fard | H04W 48/04 |

(Continued)

FOREIGN PATENT DOCUMENTS

WO    WO-2016091298 A1 *  6/2016

*Primary Examiner* — Liem H. Nguyen

(57) ABSTRACT

A method, a device, and a non-transitory storage medium are described in which a user plane congestion control service is provided. The service may analyze congestion information of user plane traffic in data sessions associated with a plurality of end devices. The service may include selecting, based on the analyzing, configuration parameters for uplink/downlink traffic mapped to one or more user class values of the end devices. The service may include generating a data session update indicating a modification to the configuration parameters for a user class value.

20 Claims, 5 Drawing Sheets

(56) References Cited

U.S. PATENT DOCUMENTS

| | | | |
|---|---|---|---|
| 2021/0112436 A1* | 4/2021 | Hoffner | H04L 41/5025 |
| 2021/0267012 A1* | 8/2021 | Huang | H04W 80/10 |
| 2022/0021624 A1* | 1/2022 | Sachs | H04L 47/28 |
| 2022/0182872 A1* | 6/2022 | John | H04W 28/0284 |
| 2023/0010519 A1* | 1/2023 | Rao Kota | H04W 28/0289 |
| 2023/0179437 A1* | 6/2023 | Muñoz de la Torre Alonso | H04M 15/66 |
| | | | 455/406 |
| 2023/0199902 A1* | 6/2023 | Vogedes | H04W 52/0251 |
| | | | 455/458 |
| 2024/0129794 A1* | 4/2024 | Talebi Fard | H04W 48/18 |
| 2024/0275887 A1* | 8/2024 | Guo | H04W 28/0268 |

\* cited by examiner

USER PLANE CONGESTION CONTROL SERVICE

BACKGROUND

Wireless networks, such as Fifth Generation New Radio (5G NR) networks, may use virtualized network functions (VNFs) at a network core to process traffic, including the enforcement of traffic policies (e.g., Quality of Service (QoS) policies, filtering, and/or other policies) and the routing of traffic to its intended destination. For example, a user plane function (UPF) of a 5G core (5GC) may apply traffic policies to traffic received from a radio access network (RAN) and may forward such traffic to an external network (i.e., uplink), such as the Internet. Similarly, the UPF may receive traffic from the external network, apply appropriate traffic policies, and forward the traffic toward a user equipment (UE) device (i.e., downlink), via the RAN.

DETAILED DESCRIPTION

Figure 1:
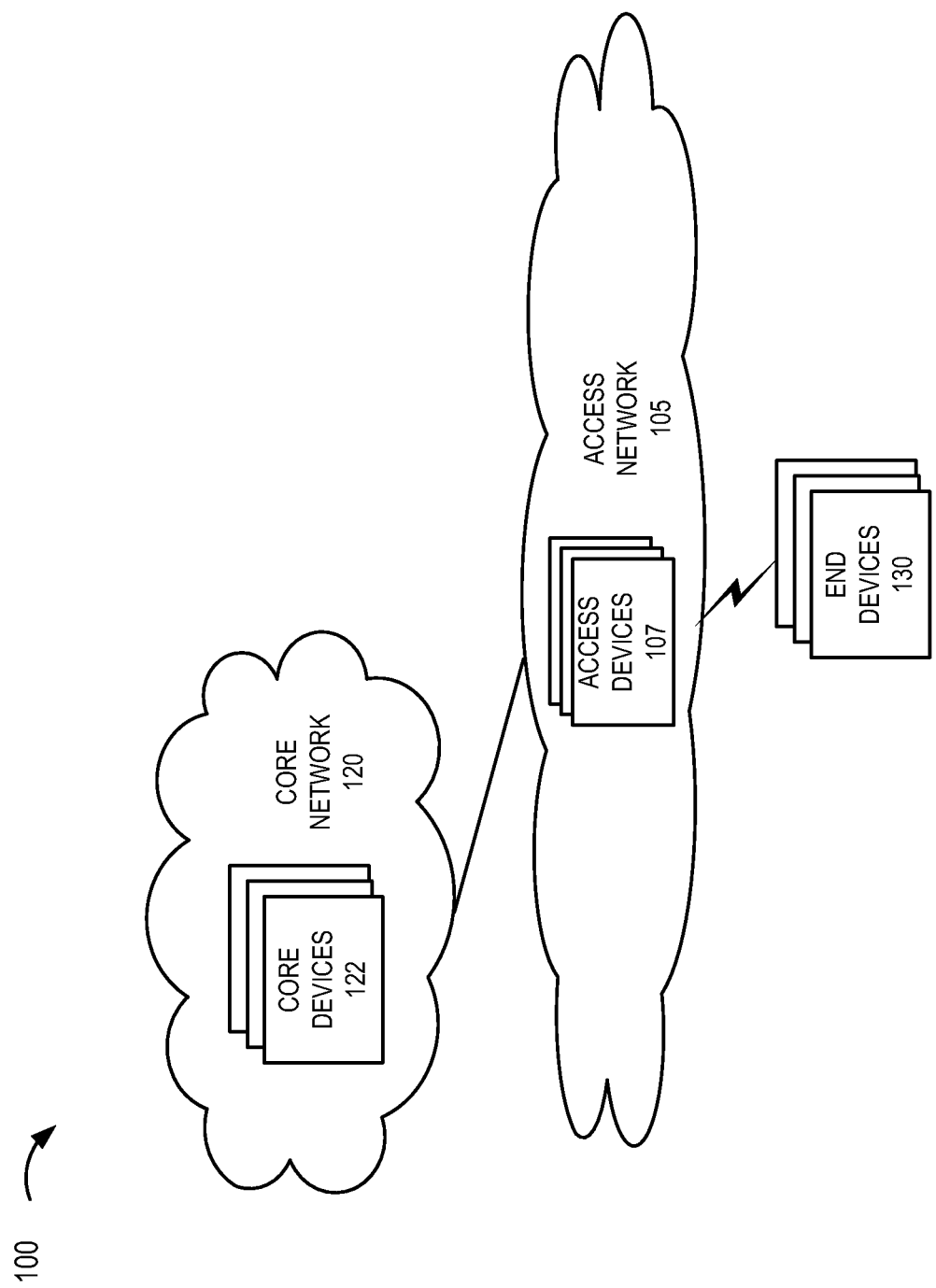
FIG. 1 is a diagram illustrating an exemplary environment in which an exemplary embodiment of a user plane congestion control service may be implemented.

The following detailed description refers to the accompanying drawings. The same reference numbers in different drawings may identify the same or similar elements. Also, the following detailed description does not limit the invention.

Responsive to user plane congestion conditions reported via a data session (i.e., central processing unit (CPU) usage and/or memory usage exceeding a configurable threshold), user plane function (UPF)/5GC networks may adaptively apply congestion mitigation measures uniformly to all end device users/UEs. For example, signal throttling of the user plane traffic may equally impact all data sessions, irrespective of user class (e.g., premium users, "ordinary" users, protected users, non-protected users, low/high priority users, etc.) and/or data session type (e.g., guaranteed bit rate (GBR) sessions, Internet protocol (IP) multimedia subsystem (IMS) sessions, mobile edge computing (MEC) sessions, or other data/application sessions associated with a particular quality indicator (QI)). That is, wireless service reconfiguration parameters may not differentiate among user classes and/or data session types in throttling levels. Other mitigation techniques may involve a control plane function (CPF) limiting creation of new data sessions and/or selection of alternate UPFs from a same UPF pool and having less load than the congested UPF.

According to exemplary embodiments, a user plane congestion control service is described. In some embodiments, a network device of a core network may be configured with user-class information and/or logic to classify users/UE devices into user-class groups. For example, a unified data repository (UDR) device and/or a unified data management (UDM) device of the core network may use a user service profile, data session set-up information, and/or monitored network resource usage information to generate user-class lists corresponding to UE device identities. According to an exemplary embodiment, the UDM and/or UDR may include logic to set the user-class designation for each user/UE device in a standardized/non-standardized extension field and/or an existing field (e.g., header, trailer, options, reserved, etc.), of a message. According to an exemplary embodiment, the message may be extended with an instance of a user-class information element (IE).

According to an exemplary embodiment, the UDM and/or UDR may include logic that forwards the message to one or more core network devices such that the exchange of the user-class IE occurs without triggering extra signaling. The message may be a request and/or a response message exchanged, for example, in a step of an initial network session set-up procedure. According to an exemplary embodiment, the core network devices (e.g., a session management function (SMF) device, a policy control function (PCF) device, etc.) are configured to forward the message to one or more UPF devices of the core network.

According to an exemplary embodiment, UPF devices may include logic to configure, store, and/or maintain user/UE device configuration parameter information, as described herein. For example, the user/UE device configuration parameter information may include throttling information indicating whether and/or at what level data session traffic is to be throttled for various user-classes corresponding to multiple levels of congestion conditions, as described herein. In some embodiments, a data structure such as a throttling table may be maintained by the UPF devices, which map or correlate throttling levels to reported user plane congestion conditions such as CPU usage/capacity, memory usage/capacity, uplink throughput, downlink throughput, user plane traffic type (e.g., GBR, non-GBR, IMS, non-IMS, etc.), user plan traffic allotment, etc.

According to an exemplary embodiment, the UPF devices may provide one or more aspects of the user plane congestion control service, as described herein, to map or correlate the user-class IE and the congestion status information to corresponding wireless service reconfiguration parameters contained in the throttling table, for example. Upon determining a need to modify the current wireless service configuration parameters of one or more user-classes, the UPF devices may generate a message indicating the data session modification update, and forward the wireless service reconfiguration parameters to each of the users/UE devices identified as belonging to the affected user-class(es).

According to an exemplary embodiment, the uplink and/or downlink communications from/to the UE device via the RAN, are performed in accordance with the wireless service reconfiguration parameters. For example, the uplink transmissions from the UE device may be throttled at a particular level, while the downlink transmissions to the UE device may be throttled at another particular level, during a duration of the current data session or until further notification (update) received from the UPF devices, resulting from, for example, further changes in the user plane congestion conditions. According to some embodiments, the uplink and/or downlink transmissions are performed without altering any enforceable traffic policy applicable to the UE device(s).

According to an exemplary embodiment, the UPF devices of the user plane congestion control service, as described herein, may use artificial intelligence (AI) and/or machine learning (ML) logic that may update information associated with the end device based on dynamic criteria, such as observed congestion levels in the RAN, changes to a user service-class profile, a geo-relocation of the end device, roaming of the end device, or another type of dynamic criterion or transient event. According to an exemplary embodiment, the UPF device may store and manage UE configuration parameter information relating to a current status of individual end devices.

According to an exemplary embodiment, the user plane congestion control service may be implemented for various types of end devices, 5G devices, 5.5G devices, future generation devices (e.g., Sixth Generation (6G) devices or other generation devices), M2M devices, smartphones, user equipment, IoT devices, and/or other types of end devices, as described herein, that may communicate with one or more core network devices (i.e., UPF device) via a RAN.

According to various exemplary embodiments, the user plane congestion control service may be implemented based on a category of an end device (e.g., 5G, Cat-1, Cat-M1, Cat-NB1, or other category), an identifier of the end device (e.g., an International Mobile Equipment Identity (IMEI)), an identifier of a memory device (e.g., an Integrated Circuit Card Identifier (ICCID)), and/or other types of identifiers, such as a network access identifier (NAI), an International Mobile Subscriber Identity (IMSI), a subscription permanent identifier (SUPI), a Mobile Directory Number (MDN), or the like. According to other exemplary embodiments, the user plane congestion control service may be implemented based on a per-application basis and/or category of application. For example, for an end device that may include multiple applications, the UPF devices may include different user-class service configuration parameters for the different applications, as described herein.

According to an exemplary embodiment, the user plane congestion control service may be dynamically enabled or disabled for an end device based on the location of the end device. According to an exemplary embodiment, an update to the congestion and/or user class-service profile may cause the end device to re-attach to the network (e.g., a different core network device) and/or re-establish a radio connection with a RAN device.

In view of the foregoing, the user plane congestion control service may allow dynamic configuration of admission control information of an end device and memory device, and manage priority of end device connections to the RAN and other networks (e.g., a core network, an application layer network, or other type of network).

FIG. 1 is a diagram illustrating an exemplary environment 100 in which an exemplary embodiment of the user plane congestion control service may be implemented. As illustrated, environment 100 includes access network 105, and a core network 120. Access network 105 includes access devices 107 (also referred to individually or generally as access device 107). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. Additionally, or alternatively, other networks not illustrated in FIG. 1 may be included, such as an X-haul network (e.g., backhaul, mid-haul, fronthaul, etc.), as described herein.

The number, the type, and the arrangement of network devices, and the number of end devices 130 are exemplary. A network device, a network element, or a network function (also referred to as a network device) may be implemented according to one or multiple architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the user plane congestion control service may use at least one of these planes of communication. Additionally, an interface of a network device and/or an end device may be modified relative to an interface defined by a standard, such as Third Generation Partnership Project (3GPP), International Telecommunication Union (ITU), European Telecommunications Standards Institute (ETSI), GSM Association (GSMA), Open RAN (O-RAN) Alliance, other entity), an interface not defined by a standard, or a new interface of the network device may be provided in order to support the communication (e.g., transmission and reception of messages, IEs, attribute value pairs (AVPs), etc.) between network devices and end devices that support the user plane congestion control service, as described herein. According to various exemplary implementations, the interface of a network device may be a service-based interface, a reference point-based interface, an O-RAN interface (e.g., virtual and/or proxy), a future generation interface, or other type of interface.

Access network 105 may include one or multiple networks of one or multiple types and technologies. For example, access network 105 may be implemented to include a 5G-access network (5G-AN) or a 5G-RAN (referred to herein as simply a 5G-RAN)), a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), an optical network, or another type of network that provides access to or can be used as an on-ramp to access network 105 and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a NG core (NGC) network, or the splitting of the various layers (e.g., physical layer, Media Access Control (MAC) layer, RLC layer, and PDCP layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone NR, standalone NR, etc.).

According to some exemplary embodiments, access network 105 may be implemented to include various architectures of wireless service, such as, for example, macrocell, microcell, femtocell, picocell, metrocell, new radio (NR) cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, licensed radio spectrum, unlicensed radio spectrum, above mm wave), and/or other attributes or technologies used for radio communication.

Depending on the implementation, access network 105 may include one or multiple types of network devices, such as access devices 107. For example, access device 107 may include a gNB, an evolved Long Term Evolution (eLTE) eNB, an eNB, a radio network controller (RNC), a remote radio head (RRH), a baseband unit (BBU), a radio unit (RU), a CU, a DU, a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB), 5G ultra-wide band (UWB) nodes, a future generation wireless access device (e.g., a 6G wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft- and hard-bonding based on demands and needs. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth.

Core network 120 may include one or multiple networks of one or multiple network types and technologies. Core network 120 may include a complementary network of access network 105. For example, core network 120 may be implemented to include a next generation core (NGC) network, an Evolved Packet Core (EPC) of an LTE, an LTE-Advanced, an LTE-A Pro, and/or a future generation core network (e.g., a 6G or beyond core network, etc.).

Depending on the implementation of core network 120, core network 120 may include various types of network devices that are illustrated in FIG. 1 as core devices 122. For example, core devices 122 may include a UPF, a Non-3GPP Interworking Function (N3IWF), an access and management mobility function (AMF), an SMF, a UDM device, a UDR device, an authentication server function (AUSF), a network slice selection function (NSSF), a network repository function (NRF), a PCF, a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

According to some exemplary embodiments, core devices 122 may include a network device that provides the user plane congestion control service, as described herein. For example, a UPF device may be configured to provide the user plane congestion control service End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device. End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and flavors of network slicing, DC service, and/or other types of connectivity services. Additionally, end device 130 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 130 may vary among end devices 130.

According to an exemplary embodiment, end device 130 includes a memory device that provides aspects of the user plane congestion control service, as described herein. For example, the memory device may be implemented as a SIM card, a UICC, an eUICC, a smart card, or another type of storage device. The memory device may include logic that uses service reconfiguration parameters to manage uplink transmissions to a network (e.g., access network 105, core network 120, etc.), as described herein. For example, the memory device may include an application, a program, a module, a script, or other type of entity that may execute instructions to provide the logic of the user plane congestion control service.

Figure 2:
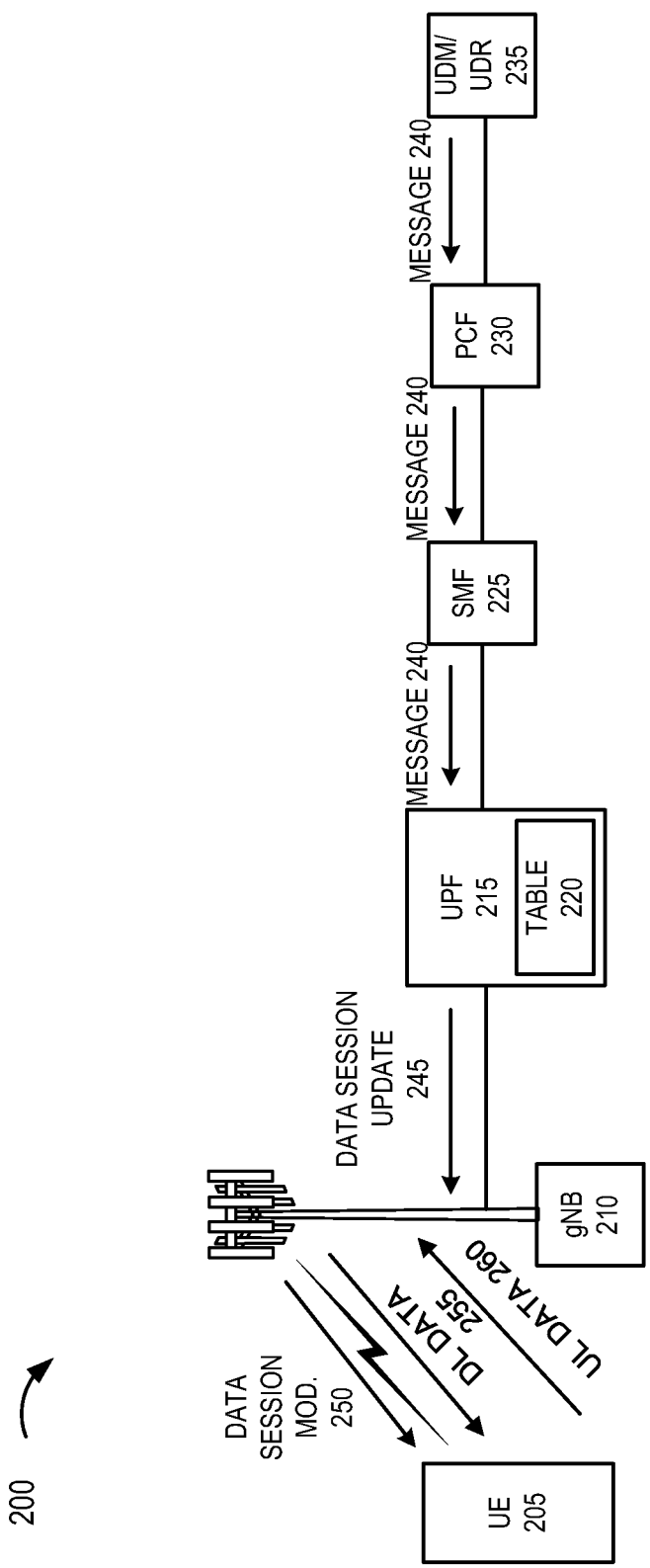
FIG. 2 is a diagram illustrating an exemplary process of an exemplary embodiment of the user plane congestion control service.

FIG. 2 is a diagram illustrating an exemplary environment 200 in which an exemplary embodiment of an exemplary user plane congestion control service may be implemented. As illustrated, environment 200 may include a UE 205 (e.g., end device 130), a gNB 210 (e.g., access device 107), and a UPF 215, SMF 225, PCF 230, and UDM/UDR 235 (e.g., core devices 122). UPF 215 may include a table 220, as described herein. Similar to that described in relation to FIG. 1 and environment 100, the number, type, and arrangement of networks and network devices illustrated in environment 200 are exemplary. Additionally, the number, type, and arrangement of communication links illustrated in environment 200 are exemplary. A communicative connection via a communication link may be direct or indirect.

UPF 215 may maintain an anchor point for intra/inter-RAT mobility, maintain an external Packet Data Unit (PDU) point of interconnect to a data network, perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a radio access network (RAN) node (e.g., gNodeB 210), and/or perform other types of user plane processes. UPF 215 may communicate with SMF 225 using an N4 interface, for example. UPF 215 may include logic that provides an exemplary embodiment of the user plane congestion control service, as described herein.

SMF 225 may perform session establishment, modification, and/or release, perform IP address allocation and management, perform Dynamic Host Configuration Protocol (DHCP) functions, perform selection and control of UPF 215, configure traffic steering at UPF 215 to guide traffic to the correct destination, terminate interfaces toward PCF 215, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 225 may be accessible via an Nsmf interface, for example.

PCF 230 may support policies to control network behavior, provide policy rules to control plane functions (e.g., to SMF 225), access subscription information relevant to policy decisions, execute policy decisions, and/or perform other types of processes associated with policy enforcement. PCF 230 may be accessible via Npcf interface, for example. PCF 230 may specify QoS policies based on QoS flow identity (QFI) consistent with 5G network standards.

UDM/UDR 235 may maintain subscription information (user service profiles) for UE 205, manage service configuration and performance parameters, generate authentication credentials, handle user identification, perform access authorization based on user service data, perform network function registration management, maintain service and/or session continuity by maintaining assignment of SMF 225 for ongoing sessions, support SMS delivery, support transmission intercept functionality, and/or perform other processes associated with managing user data. The user service profiles pertaining to UEs 205 may include user device profile information (e.g., end device identifiers, category or type of UE device 205, tier of service, etc.). User service profiles may also include mobility information and historical behavior information pertaining to UEs 205. For example, the historical behavior information may include information indicating applications used, mobility information, time periods of activity and inactivity, and so forth. UDM/UDR 235 may include logic that provides an exemplary embodiment of the user plane congestion control service, as described herein.

Referring to FIG. 2, according to an exemplary uplink/downlink scenario and exemplary user plane congestion control service, UDM/UDR 235 may obtain user service profiles for UE devices 205 connecting/connected to core network 120 via gNB 210. According to various exemplary embodiments, UDM/UDR 235 may retrieve the user service profiles from an information technology (IT) monitoring platform of a network operator associated with core network 120, or from another source. In some embodiments, the user service profiles for UE devices 205 contain user-class values that indicate which user-class UE 205 belongs to, as described herein. Additionally, or alternatively, UDM/UDR 235 may, using the user service profile data, classify (or reclassify) one or more UE 205 into a user-class based on the user service profile data associated with each UE 205.

Based on the user-class value determination, UDM/UDR 235 may generate and transmit a request and/or a response message to gNB 210, for example, in a step of an initial network session set-up procedure with UE 205. Message 240 may be a standardized/non-standardized message that is extended to include an instance of a user-class value indicative of UE 205's user-class for a PDU session via gNB 210. Additionally, or alternatively, message 240 may include other data that may reflect a change in a user service profile, which is then generated by UDM/UDR 235 and transmitted in standardized messaging, for example during an existing PDU session.

As illustrated, message 240 may be forwarded within core network 120 to UPF 215 via PCF 230 and SMF 225 and/or any other core network device 122, with or without alteration to or processing of the user-class values. UPF 215 may examine message 240 to identify a user-class for UE 205.

UPF 215 may map or correlate the identified user-class for UE 205 to a current operating state of UPF 215 indexed in table 220. For example, table 220 may contain values for UPF 215's current resource availability such as CPU usage of its CPU capacity, memory usage of its memory storage capacity, throughput usage of its throughput capacity, and/or other performance and/or utilization of network resource measures.

Based on the mapping of UE 205's user-class value to UPF 215's various resource availability values or composite values of same, corresponding to a particular level of UPF 215 congestion, table 220 may contain indexed service configuration/reconfiguration parameters for a PDU session (e.g., downlink and/or uplink data traffic) for UE 205. UPF 215 may enforce the service configuration/reconfiguration parameters in downlink data 255 transmissions to UE 205 during the PDU session. If the configuration/reconfiguration parameters constitute a modification of the existing PDU session, UPF 215 may generate and transmit a PDU session update 245 to gNB 210 and/or UE 205 informing one or both of the modification, e.g., throttling of downlink and/or uplink data traffic, for example, until further notification corresponding to a further change in the level of congestion of the user plane. In some embodiments, if only the downlink traffic is to be throttled, for example, no PDU session update may be generated and/or transmitted.

gNB 210 may read PDU session update 245 and generate and transmit a PDU session modification 250 to UE 205. In response to receiving PDU session modification 250, UE 205 may transmit uplink data 260 to gNB 210 over a modified user plane bearer path in accordance with the service configuration/reconfiguration parameters. In one embodiment, the exemplary user plane congestion control service may, irrespective of the service configuration/reconfiguration parameters, enforce various policies such as QoS applied to UE 205's PDU sessions. For example, the exemplary user plane congestion control service does not subject one or more types of application traffic, such as IMS traffic, GBR traffic, or the like to the prescribed service configuration/reconfiguration parameters for UE 205's data session, as described herein.

FIG. 2 is a diagram illustrating an exemplary environment in which an exemplary user plane congestion control service may be implemented. According to other exemplary embodiments, the exemplary environment may be different and/or the exemplary process may include additional, different, or fewer operations than those illustrated and/or described in relation to FIG. 2.

Figure 3:
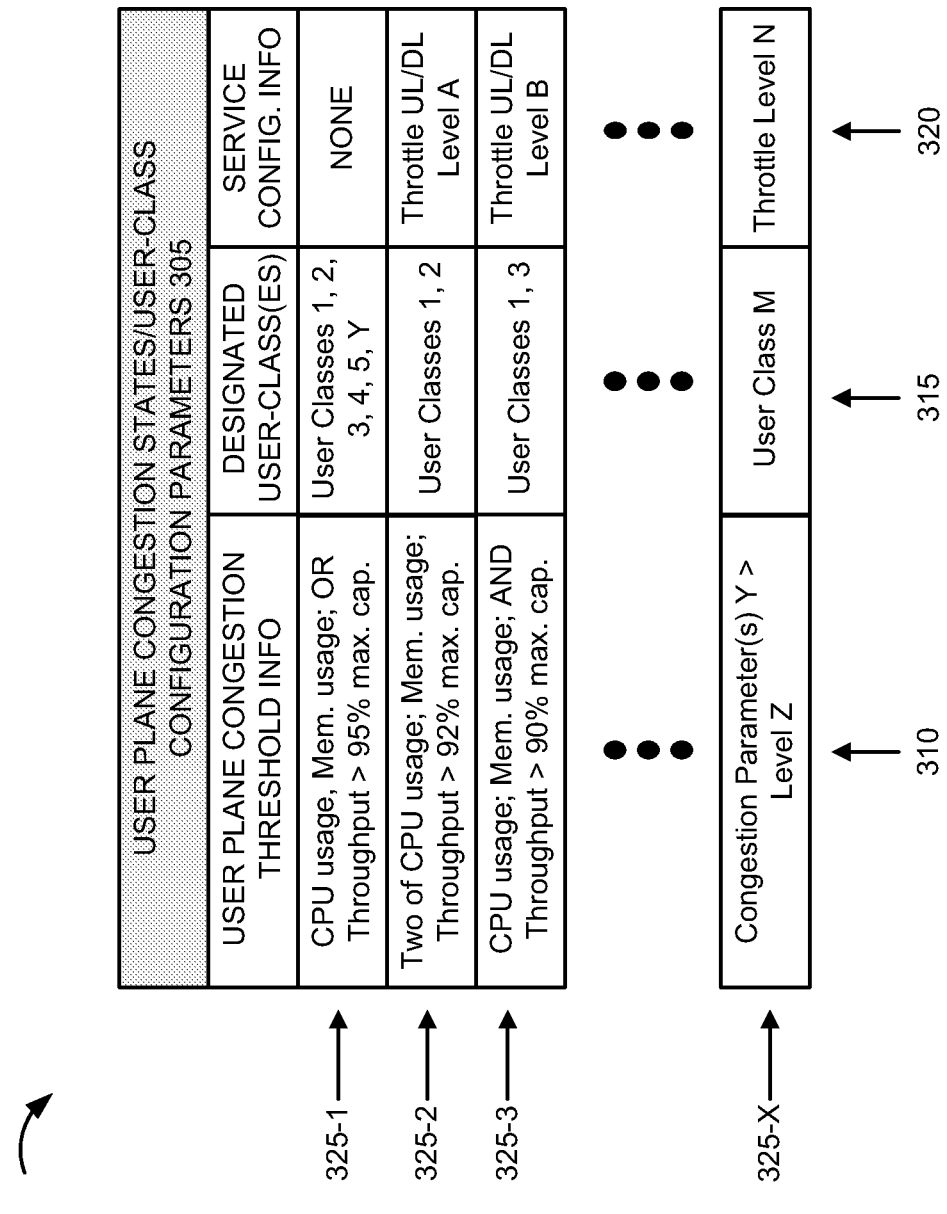
FIG. 3 is a diagram illustrating exemplary user plane congestion state and user-class configuration parameters.

FIG. 3 is a diagram illustrating exemplary user plane congestion state and user-class configuration parameters 305 that may be stored in table 220, for example. As illustrated, user plane congestion states and user-class configuration parameters 305 may include a user plane congestion threshold field 310, a designated user class(es) field 315, and a service configuration field 320. As further illustrated, user plane congestion state and user-class configuration parameters 305 may include mappings 325-1 through 325-*x* (also referred to collectively as mappings 325 or individually or generally as mapping 325) between fields 310, 315, and 320. In this manner, user plane congestion threshold field 310 may store configurable user plane congestion threshold/range values, designated user class(es) field 315 may store configurable user-class values, and service configuration field 320 may store configurable service configuration/reconfiguration parameter values (e.g., throughput throttling levels). The table entries and the values described in relation to mappings 325 are merely exemplary.

User plane congestion states and user-class configuration parameters 305 is illustrated in tabular form merely for the sake of description. According to other implementations, user plane congestion states and user-class configuration parameters 305 may be implemented in a data structure different from a table (e.g., a list, a flat file, etc.), a database, or other type of data file.

According to other exemplary implementations, table 300 may store additional, fewer, and/or different instances of user plane congestion states and user-class configuration parameters 305 in support of the user plane congestion control service, as described herein. For example, mappings 325 as described herein may apply on a per application basis and/or per category of application basis. For example, UE device 205 may include applications that may be managed with different default user-class values, current user-class values, total number of classes supported, timed user-class values, and so forth. This may be in addition to a per end device basis or instead of a per end device basis.

Referring back to FIG. 3, UPF 215 may maintain current (e.g., substantially real-time) user plane congestion parameters or may retrieve some or all of the user plane congestion information from another resource within core network 120 or not. User plane congestion threshold information 310 may include one or multiple congestion parameters relating to CPU usage and maximum CPU capacity, memory usage and maximum memory capacity, throughput, and maximum throughput capacity, and/or other configurable criterion. The configurable congestion thresholds may be based on any number and/or any combination of parameters and correspond to differing nominal values of user plane congestion. The ranges of usage may be weighted differently and/or normalized. Incomplete information with respect to one or multiple parameters may be substituted with a default value and/or omitted altogether. In one embodiment, UPF 215 may determine user plane congestion states using one or multiple types of learning-based algorithms, such as reinforcement-based learning, unsupervised learning, semi-supervised learning, supervised learning, deep learning, learning from situation awareness and successful handling of obstacles, and/or artificial intelligence or other type of device intelligence. UPF 215 may include a model that has been trained to perform the functions of user plane congestion control for UE 205. For example, the model may include a Generative Adversarial Network (GAN), a neural network, a probabilistic model, a Markov Chain, an autoencoder, a variational autoencoder, a non-probabilistic model, or other type of model.

In one embodiment, the congestion states corresponding to mappings 325 are correlated to designated user-classes field 315 associated with each UE 205 connected via a user plane bearer to UPF 215, and configurable service configuration information field 320. In some embodiments, UPF 215 may use user plane congestion states and user-class configuration parameters 305 to determine whether mitigation measures are to be implemented for one or multiple user-classes associated with bearer channels. UPF 215 may learn user plane congestion control and mitigation in a context-aware manner based on analytical evaluation of current user-class designations for UE 205.

Based on the mapping, UPF 215 may configure one or multiple service configuration parameters 320 for a bearer path for UE 205. For example, UPF 215 may determine whether or not the bearer path for UE 205 is to be updated, and when an update is determined, which parameter and value are to be updated and the substance of the update (e.g., a change in value for a select parameter). In this manner, UPF 215's learning logic may optimize the configuration of user service parameters (e.g., current throughput level) for UE 205 for mitigation and/or elimination of anticipatory and/or current congestion at UPF 215 and more generally within core network 120. Additionally, or alternatively, UPF 215's learning logic may change and/or optimize the configuration of user service parameters for UE 205 in accordance to a determined user-class of UE 205 based on user service profile information, which may include historical information, sensor information, mobility information, end device profile information (e.g., type of end device, applications used, tier of service etc.), congestion information, service parameters configured on end devices 130, and/or other types of information of relevance. According to various exemplary implementations, congestion mitigation determinations may be based on a user-class of UE 205 based on contextual information, such as public safety, public security, protected/nonprotected status, premium/non-premium tier of service, or another type of configurable consideration.

Referring back to FIG. 2, according to this exemplary scenario, assume that UPF 215 determines to update the bearer configuration of UE 205. According to one embodiment, UPF 210 may generate and transmit a PDU session update request 245 to UE 205. PDU session update request 245 may include one or multiple values relating to one or multiple parameters of the bearer configuration.

In response to receiving PDU session update request 245, UE 205 may modify the current bearer configuration, for example, to throttle throughput below a specified level per PDU session update request 245. For example, UE 205 may overwrite bearer configuration information for the PDU session for uplink data 260.

Although FIG. 2 illustrates an exemplary embodiment of a process of the user plane congestion control service, according to other exemplary scenarios, the user plane congestion control service may perform additional operations, fewer operations, and/or different operations than those illustrated and described. For example, UPF 215 may not generate and transmit PDU session update request 245 when UPF 215 determines that the bearer configuration for the uplink transmissions from UE 205 do not need to be updated.

Figure 4:
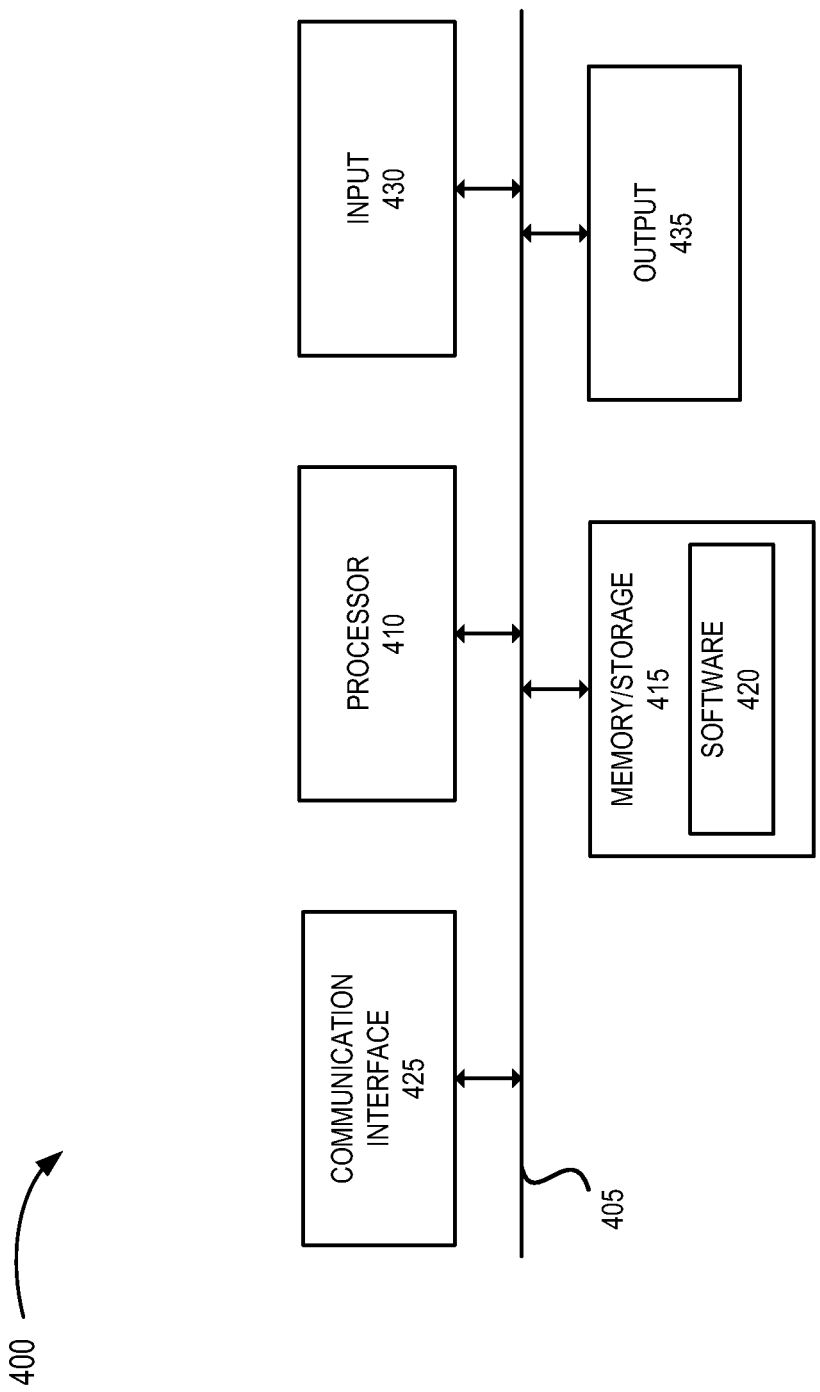
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, core device 122, UE 205, UPF 215, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to UPF 215, software 420 may include an application that, when executed by processor 410, provides a function and/or a process of the user plane congestion control service, as described herein. Additionally, for example, with reference to UE 205, software 420 may include an application that, when executed by processor 410, provides a function and/or a process of the user plane congestion control service. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., an external network and/or another type of network (e.g., access network 105, etc.).

Device 400 may perform a process and/or a function, as described herein, in response to processor 410 executing software 420 stored by memory/storage 415. By way of example, instructions may be read into memory/storage 415 from another memory/storage 515 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
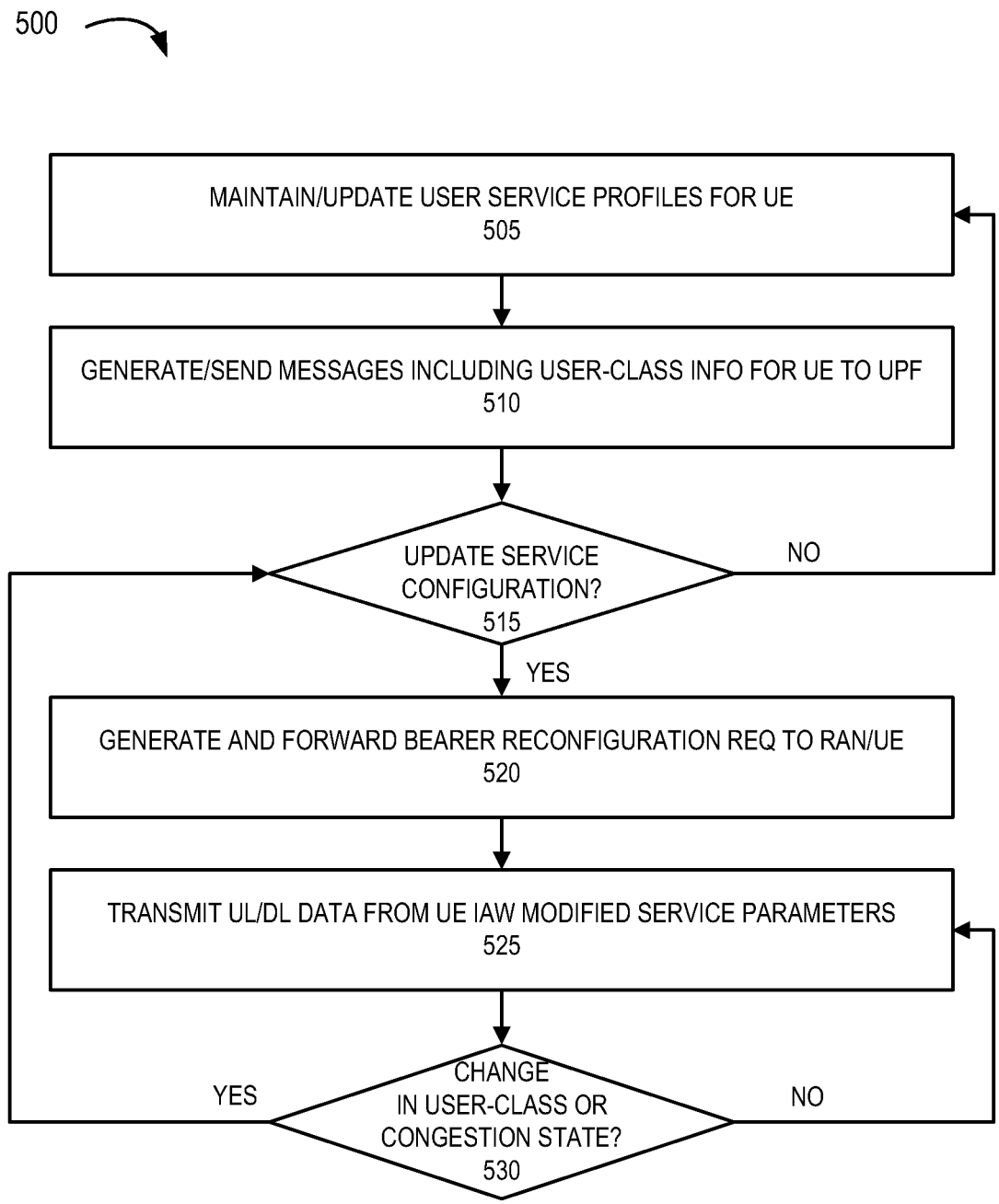
FIG. 5 is a flow diagram illustrating an exemplary process of an exemplary embodiment of the user plane congestion control service.

FIG. 5 is a flow diagram illustrating an exemplary process 500 of an exemplary embodiment of the user plane congestion control service. According to an exemplary embodiment, UPF 215, UDM/UDR 235, and/or UE 205 may perform steps of process 500. According to an exemplary implementation, processor 410 executes software 420 to perform a step of process 500, as described herein. Alternatively, a step of may be performed by execution of only hardware.

In block 505, UDM/UDR 235 may obtain user service profiles associated with UE 205. For example, the profile information may include user device profile information (e.g., end device identifiers, category or type of end device, tier of service, etc.). Other user information may include network resource usage levels, historical and/or current. UDM/UDR 235 may analyze the user service profiles and classify UE 205 into nominal user-classes. For example, UPF 215 may use AI/ML algorithms and models to evaluate the user information in relation to configurable user-classes of relative priority, such as premium tier of service, standard tier of service, protected, non-protected, over-user, and the like, as designated by the network operator, for instance. In block 510, UDM/UDR 235 may generate a message including a user-class value (e.g., an instance of an IE) and forward the message to UPF 215 (e.g., via PCF 230, SMF 225, etc.).

In block 515, UPF 215 may determine whether to update the service configuration parameters of one or multiple UE devices 205 based on the user-class values and user plane congestions states maintained and/or retrieved by UPF 215. For example, UPF 215 may determine whether user plane congestion levels and particular user-class values map to service parameter reconfiguration procedures for identified uplink or downlink signaling in a data session with UE 205.

When UPF 215 determines to not update the existing service parameters (block 515—NO), process 500 may return to block 505. When UPF 215 determines to update one or multiple service parameters (block 515—YES), UPF 215 may generate and forward a bearer reconfiguration request, e.g., pertaining to uplink user plane traffic, to gNB 210 and/or UE 205 (block 520). For example, UPF 215 may select one or multiple parameters (e.g., throughput throttling) and retrieve corresponding new values from table 220. In one embodiment, when only downlink traffic is to be updated, UPF 215 may send a notification message (instead of the bearer request) to inform gNB 210 and/or UE 205 of the modification.

In block 525, UE 205 may, based on the bearer reconfiguration, transmit uplink data in accordance with the modified service parameters to support the user plane congestion mitigation efforts. In block 530, a determination may be made whether, based on updated user service profile information, the user-class for UE 205 has changed, and/or a change in the user plane congestion state has occurred. Responsive to a change in either, block 530—YES, process 500 may continue to block 515. If not, block 530—NO, transmission of uplink user plane data from UE 205 may continue according to the throttled throughput level. In some embodiments, an exception to the reconfigured service parameters is made for select categories of signaling, such as GBR, IMS, and the like.

Although FIG. 5 illustrates an exemplary embodiment of a process of the user plane congestion control service, according to other exemplary scenarios, the user plane congestion control service may perform additional operations, fewer operations, and/or different operations than those illustrated and described.

As set forth in this description and illustrated by the drawings, reference is made to "an exemplary embodiment," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the processes illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   storing, by a network device, user class values associated with a plurality of end devices;
   analyzing, by the network device, congestion information of a user plane function (UPF) included in a core network for data sessions associated with the plurality of end devices, wherein the congestion information is based on congestion in the core network associated with the UPF;
   selecting, by the network device based on the analyzing, service configuration parameters for first UPF traffic mapped to one or more of the user class values;
   generating, by the network device, a first data session update indicating a first modification to first service configuration parameters for a first one of the user class values; and
   transmitting, by the network device, the first data session update to at least a first end device associated with the first user class value.

2. The method of claim 1, wherein the one or more user class values comprises multiple user class values, the method further comprising:
   generating a second data session update indicating a second modification to second service configuration parameters for a second user class value, wherein the first service configuration parameters and the second service configuration parameters differ; and
   transmitting the second data session update to at least a second end device associated with the second user class value.

3. The method of claim 1, wherein the one or more user class values comprises multiple user class values, the method further comprising:
   determining, based on the analyzing, not to throttle second UPF traffic of at least one user class value of the end devices.

4. The method of claim 3, wherein the at least one user class value comprises at least one of a premium tier of service.

5. The method of claim 3, wherein the second UPF traffic comprises at least one of Internet protocol multimedia systems (IMS) traffic or guaranteed bit rate (GBR) traffic.

6. The method of claim 1, further comprising:
   receiving the user class values via a message that contains an instance of a user class value information element (IE).

7. The method of claim 6, further comprising:
   receiving the message from a unified data management (UDM) device or a unified data repository (UDR) device in the core network.

8. The method of claim 1, wherein the first modification is performed without altering any traffic policy applicable to the at least first end device.

9. A network device comprising:
a processor configured to:
store user class values associated with a plurality of end devices;
analyze congestion information of a user plane function (UPF) included in a core network for data sessions associated with the plurality of end devices, wherein the congestion information is based on congestion in the core network associated with the UPF;
select, based on the analyzing, service configuration parameters for first UPF traffic mapped to one or more of the user class values;
generate a first data session update indicating a first modification to first service configuration parameters for a first one of the user class values; and
transmit the first data session update to at least a first end device associated with the first user class value.

10. The network device of claim 9, wherein the one or more user class values comprises multiple user class values, and wherein the processor is further configured to:
generate a second data session update indicating a second modification to second service configuration parameters for a second user class value, wherein the first service configuration parameters and the second service configuration parameters differ; and
transmit the second data session update to at least a second end device associated with the second user class value.

11. The network device of claim 9, wherein the one or more user class values comprises multiple user class values, and wherein the processor is further configured to:
determine, based on the analyzing, not to throttle second UPF traffic of at least one user class value of the end devices.

12. The network device of claim 11, wherein the at least one user class value comprises at least one of a premium tier of service.

13. The network device of claim 11, wherein the second UPF traffic comprises at least one of Internet protocol multimedia systems (IMS) traffic or guaranteed bit rate (GBR) traffic.

14. The network device of claim 9, wherein the processor is further configured to:
receive the user class values via a message that contains an instance of a user class value information element (IE).

15. The network device of claim 14, wherein the processor is further configured to:
receive the message from a unified data management (UDM) device or a unified data repository (UDR) device in the core network.

16. The network device of claim 9, wherein the first modification is performed without altering any traffic policy applicable to the at least first end device.

17. A non-transitory computer-readable storage medium storing instructions executable by a processor of a network device, which when executed cause the network device to:
store user class values associate with a plurality of end devices;
analyze congestion information of a user plane function (UPF) included in a core network for data sessions associated with the plurality of end devices, wherein the congestion information is based on congestion in the core network associated with the UPF;
select, based on the analyzing, service configuration parameters for first UPF traffic mapped to one or more of the user class values;
generate a first data session update indicating a first modification to a first service configuration parameters for a first one of the user class values; and
transmit the first data session update to at least a first end device associated with the first user class value.

18. The non-transitory computer-readable storage medium of claim 17,
wherein the one or more user class values comprises multiple user class values, and wherein the instructions further comprise instructions, which when executed cause the network device to:
generate a second data session update indicating a second modification to second service configuration parameters for a second user class value, wherein the first service configuration parameters and the second service configuration parameters differ; and
transmit the second data session update to at least a second end device associated with the second user class value.

19. The non-transitory computer-readable storage medium of claim 17, wherein the one or more user class values comprises multiple user class values, and wherein the instructions further comprise instructions, which when executed cause the network device to:
determine, based on the analyzing, not to throttle second UPF traffic of at least one user class value of the end devices.

20. The non-transitory computer-readable storage medium of claim 17, wherein the instructions for further comprise instructions, which when executed cause the network device to:
receive the user class values via a message that contains an extension field including a user class value information element (IE), and
receive the message from a unified data management (UDM) device or a unified data repository (UDR) device in the core network.

* * * * *